United States Patent
Youngblood et al.

(10) Patent No.: US 11,174,404 B2
(45) Date of Patent: Nov. 16, 2021

(54) CONTINUOUS ROLL-TO-ROLL FABRICATION OF CELLULOSE NANOCRYSTAL (CNC) COATINGS

(71) Applicant: Purdue Research Foundation, West Lafayette, IN (US)

(72) Inventors: Jeffrey Paul Youngblood, Crawfordsville, IN (US); Reaz Chowdhury, West Lafayette, IN (US); Md Nuruddin, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/643,034

(22) PCT Filed: Sep. 4, 2018

(86) PCT No.: PCT/US2018/049312
§ 371 (c)(1),
(2) Date: Feb. 28, 2020

(87) PCT Pub. No.: WO2019/050819
PCT Pub. Date: Mar. 14, 2019

(65) Prior Publication Data
US 2020/0263047 A1  Aug. 20, 2020

Related U.S. Application Data (60) Provisional application No. 62/555,084, filed on Sep. 7, 2017.

(51) Int. Cl.
*B05D 1/28* (2006.01)
*B05D 3/00* (2006.01)
(Continued)

(52) U.S. Cl.
CPC ............ *C09D 11/14* (2013.01); *C09D 11/106* (2013.01); *C09D 101/02* (2013.01); *C09D 129/04* (2013.01)

(58) Field of Classification Search
CPC ....................................... C09D 11/14
See application file for complete search history.

(56) References Cited

U.S. PATENT DOCUMENTS

2011/0290436 A1* 12/2011 Dumas ................... A24D 1/025
162/136
2013/0264732 A1* 10/2013 Youngblood ........... B29C 55/00
264/28
(Continued)

FOREIGN PATENT DOCUMENTS

WO  2014118466  8/2014
WO  2017046798  3/2017

OTHER PUBLICATIONS

Kumar et al., Ind. Eng. Chem. Res. 2016, 55, 3603-3613.*
(Continued)

*Primary Examiner* — Vu A Nguyen
(74) *Attorney, Agent, or Firm* — Hartman Global IP Law; Gary M. Hartman; Domenica N. S. Hartman (57) ABSTRACT

The present application relates to a novel method of large scale continuous roll-to-roll fabrication of cellulose nanocrystal (CNC) coatings with controlled anisotropy, and the cellulose nanocrystal (CNC) coated flexible substrate prepared with the novel method. An unexpectedly high order parameter of 0.78 is observed when in CNC-PVA composite at 70% CNC loading.

10 Claims, 4 Drawing Sheets

(51) Int. Cl.
*C09D 11/106* (2014.01)
*C09D 101/02* (2006.01)
*C09D 129/04* (2006.01)
*C09D 11/14* (2006.01)

(56) References Cited

U.S. PATENT DOCUMENTS

2017/0204567 A1 7/2017 Yu et al.
2017/0267009 A1* 9/2017 Aspler .................... B41M 5/52

OTHER PUBLICATIONS

Chowdhury, R.A. et al., "Roll-to-Roll Fabrication of Cellulose Nanocrystal-poly(vinyl alcohol) Composite Coatings with Controlled Anisotropy", Springer Nature B.V. (2018), Cellulose https://doi.org/10.1007/s10570-018-2019-5.
International Search Report for International Application No. PCT/US18/49312, dated Oct. 30, 2018, (3 pages).

* cited by examiner

CONTINUOUS ROLL-TO-ROLL FABRICATION OF CELLULOSE NANOCRYSTAL (CNC) COATINGS

CROSS-REFERENCE TO RELATED APPLICATION

This application claims priority to International Patent Application No. PCT/US18/49312, filed Sep. 4, 2018, which claims the benefits of United States Provisional Application Serial No. 62/555,084, filed Sep. 7, 2017. The contents of these prior patent documents are incorporated herein by reference entirely.

GOVERNMENT SUPPORT CLAUSE

This invention was made with government support under CMMI-1449358 and 1144843 awarded by the United States National Science Foundation. The government has certain rights in the invention.

TECHNICAL FIELD

The present application relates to a novel method of continuous roll-to-roll fabrication of cellulose nanocrystal (CNC) coatings with controlled anisotropy, and the cellulose nanocrystal (CNC) coated flexible substrate prepared with the novel method.

BACKGROUND

This section introduces aspects that may help facilitate a better understanding of the disclosure. Accordingly, these statements are to be read in this light and are not to be understood as admissions about what is or is not prior art.

Cellulose nanocrystals (CNCs), also known as nanocrystalline cellulose (NCC), are an alternative renewable raw material derived from abundant resources: wood, plants, algae, tunicate, bacteria, etc. CNCs are distinguished from other cellulose nanomaterials in that they are rod-shaped and rigid with lengths of 50-1000 nm, widths of 1-20 nm, and highly crystalline. CNCs have excellent properties, such as non-toxicity, biodegradability, high specific strength, high thermal conductivity, and optical transparency.

Based on these remarkable properties, CNCs are applicable as a reinforcement component in nanocomposites, transparent media in organic electronics, anti-counterfeiting in security applications, and barriers in packaging applications. CNCs can form a coating, film, aerogel or foam depending on the desired final application.

The mechanical, thermal and optical properties of CNC materials depend significantly on the structural arrangement of the crystalline domain. Depending on the crystal domain organization, CNC materials can be isotropic or anisotropic (isotropic is directionally independent, and anisotropic is directionally dependent). An anisotropic configuration can exhibit enhanced properties in the orientation direction. For example, a four-fold higher thermal conductivity in a specific direction compared to the isotropic configuration.

Solution casting using mechanical shear force is the most common technique for anisotropic CNC film fabrication. Solution casting is a convenient and inexpensive small-scale processing technique, however high viscosity solutions are primarily used. High concentrations of CNC (and thus high viscosity solutions) allow for limited mobility of the CNCs during processing and therefore, the coating retains shear-induced anisotropy in its final structure. However, difficulties exist in achieving a uniform homogeneous thickness and the fabrication process is time consuming for such solutions (an hour to several days). Spin-coating overcomes this limitation, but large area processing is a challenge for this method.

There is, therefore an unmet need for an inexpensive, fast process with large-scale continuous fabrication of CNC onto flexible substrates to ensure substantially uniform CNC coating with controlled anisotropy.

SUMMARY

The present disclosure provides a novel continuous roll-to-roll manufacturing process suitable for large scale manufacture for cellulose nanocrystal (CNC) coatings on a flexible substrate.

In one embodiment, the present disclosure provides a method of continuous roll-to-roll coating of a flexible substrate with at least one cellulose nanocrystal (CNC) layer, wherein the method comprises:

a) providing a substantially homogeneous aqueous suspension of CNC, wherein the aqueous suspension comprises 4-20 wt % of CNC and 80-96 wt % of water;

b) providing a roll-to-roll coating device that continuously feeds flexible substrate;

c) treating the surface of the flexible substrate to ensure that the flexible substrate has a surface energy value equal or higher than the surface tension of the aqueous suspension of CNC; and d) transferring the aqueous suspension of CNC to the surface of the flexible substrate to create a CNC wetted region and continuously passing the wetted region to a drying unit of the roll-to-roll coating device to provide substantially dried CNC coated flexible substrate, wherein the drying temperature is between 60-100° C.

In one embodiment, the present disclosure provides a CNC coated flexible substrate prepared by the method of continuous roll-to-roll coating as disclosed in the present disclosure.

DETAILED DESCRIPTION

For the purposes of promoting an understanding of the principles of the present disclosure, reference will now be made to the embodiments. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

In the present disclosure the term "nanoparticles" refers particles with average particle length between 1-1000 nm, 1-900 nm, 1-800 nm, 1-700 nm, 1-600 nm, 1-500 nm, 1-400 nm, 1-300 nm, 1-200 nm, 1-100 nm, 1-90 nm, 1-80-nm, 1-70 nm, 1-60 nm, or 1-50 nm.

Roll-to-roll (R2R) is a family of manufacturing techniques involving continuous processing of a flexible substrate as it is transferred between two moving rolls of material. R2R is an important class of substrate-based manufacturing processes in which additive and subtractive processes can be used to build structures in a continuous manner.

R2R is a "process" comprising many technologies that, when combined, can produce rolls of finished material in an efficient and cost effective manner with the benefits of high production rates and in mass quantities. Today, R2R processing is applied in numerous manufacturing fields such as flexible and large-area electronics devices, flexible solar panels, printed/flexible thin-film batteries, fibers and textiles, metal foil and sheet manufacturing, medical products, energy products in buildings, and membranes to name a few.

A non-limiting list of R2R may be but is not limited to vacuum deposition, gravure, micro-gravure, flexographic printing, flatbed and rotary screen printing, imprint or soft lithography, laser ablation, offset printing, inkjet printing, etc.

Very limited work has been done using R2R with cellulose nanomaterials. Previous studies focused on pure CNF and CNF mixtures for thin or thick coating formations. See Kumar et al. (2016) Roll-to-roll processed cellulose nanofiber coatings, Industrial & Engineering Chemistry Research, 2016, 55 (12), 3603-3613. However, some additional additives such as carboxymethyl cellulose (CMC) is required to achieve the acceptable coating quality for CNF. Even by adding CMC, the coated flexible substrate in not transparent. Further, CNF coating achieved is not anisotropic. An anisotropic coating can exhibit enhanced properties in the orientation direction. For example, a four-fold higher thermal conductivity in a specific direction compared to the isotropic configuration. Due to high viscosity, only up to 2% of CNF suspension can be used for the coating process. Such as lower concentration cannot provide sufficient thickness to ensure sufficient strength and other desired features.

Therefore, the is an unmet need to develop a continuous roll-to-roll method suitable for preparing large scale CNC coated flexible substrate for better coating qualities, lower cost, and faster coating speed, wherein the CNC coating has desirable anisotropic characteristics.

A continuous roll-to-roll manufacturing process suitable for large-scale cellulose nanocrystal (CNC) coatings on a flexible substrate has been disclosed in the present disclosure. It was found surprisingly that the controlled anisotropy can be achieved under such process conditions.

For illustration purpose, the processing parameters for a given micro-gravure roll-to-roll process that control the coating structure and properties were examined. For a given gravure roll, the CNC concentration, the surface energy of a flexible substrate to be coated by CNC, treating temperatures, gravure speed, substrate speed, and ink viscosity were determined to be important parameters that control the coating quality. After successful fabrication, CNC coating adhesion was investigated with a crosshatch adhesion test. The adhesive strength of the CNC coating was correlated with coating thickness, and the maximum coating strength was observed for the lowest coating thickness. Coatings were characterized using atomic force microscopy and UV-VIS spectroscopy. Finally, the crystalline domain arrangement of coatings was determined for coatings made from a variety of CNC concentrations, and the effect of viscosity on CNC alignment was explained by variation of shear rate, which was controlled by the micro-gravure rotation.

The roll-to-roll (R2R) manufacturing process is a versatile technique for the fabrication of flexible coatings, polymer solar cells, and flexible electronic devices. Both printing and coating are possible in a roll-to-roll system, which can be coupled with slot-die, gravure, spray, inkjet, nanoimprinting, or rotary screen. In an R2R gravure process, ink is continuously transferred from an ink bath to the gravure cylinder. A doctor blade is placed over the gravure cylinder to remove the excess ink and maintain a constant uniform ink thickness. A thermoplastic, flexible polymer film is used as a substrate, which continuously moves between the two rolls. A liquid bridge between the gravure cavity and the web (substrate) that is stretched and sheared with a moving contact line is the basic mechanism of the ink transfer from the gravure to the web. Typically, the wet liquid film then passes through a drying chamber and dried. The overall coating quality largely depends on the ink's compatibility with the substrate, gravure speed rate, web speed, drying unit, and solvent type. Gravure coating has been used to fabricate organic thin film transistors, light-emitting polymer diodes, organic photovoltaics, and electrochromic devices.

In one embodiment, the present disclosure provides a method of continuous roll-to-roll coating of a flexible substrate with at least one cellulose nanocrystal (CNC) layer, wherein the method comprises:

a) providing a substantially homogeneous aqueous suspension of CNC, wherein the aqueous suspension comprises 4-20 wt % of CNC and 80-96 wt % of water;

b) providing a roll-to-roll coating device that continuously feeds flexible substrate;

c) treating the surface of the flexible substrate to ensure that the flexible substrate has a surface energy value equal or higher than the surface tension of the aqueous suspension of CNC; and d) transferring the aqueous suspension of CNC to the surface of the flexible substrate to create a CNC wetted region and continuously passing the wetted region to a drying unit of the roll-to-roll coating device to provide substantially dried CNC coated flexible substrate, wherein the drying temperature is between 60-100° C.

In one embodiment, the method of the present disclosure provides that the roll-to-roll device may be but is not limited to vacuum deposition, gravure, micro-gravure, flexographic printing, flatbed and rotary screen printing, imprint or soft lithography, laser ablation, offset printing, or inkjet printing, In one embodiment, the method of the present disclosure provides that the roll-to-roll device is a micro-gravure device.

In one embodiment, the method of the present disclosure provides that the roll-to-roll device is a micro-gravure device, wherein the gravure speed is about 4 rpm-200 rpm, 4 rpm-100 rpm, or 4 rpm-75 rpm.

In one embodiment, the method of the present disclosure provides that the roll-to-roll device is a micro-gravure device, wherein the roller speed is at least 0.2 m/min, 0.5 m/min, 1.0 m/min, 2.0 m/min, or 3.0 m/min. In one aspect, the roller speed is about 0.2-20 m/min, 0.2-10 m/min, 0.2-5 m/min, 0.5-20 m/min, 0.5-10 m/min, or 0.5-5 m/min.

In one embodiment, the method of the present disclosure provides that the roll-to-roll device is a micro gravure device, wherein the web speed is no more than 5 m/min, 4 m/min, 3 m/min, 2 m/min, or 1.5 m/min. In one aspect, the web speed is about 0.1-5 m/min, 0.1-2.5 m/min, 0.5-1.5 m/min, 1.0-5 m/min, 1.0-2.5 m/min, or 1.0-1.5 m/min.

In one embodiment, the method of the present disclosure provides that the roll-to-roll device is a micro gravure device with a speed ratio (web speed/roll speed) of 0.1-3, 0.1-2, 0.1-1.5, 0.3-3, 0.3-2, or 0.3-1.5.

In one embodiment, the method of the present disclosure provides that the roll-to-roll micro gravure fabrication processes is performed with a variable substrate speed 0.1-50 m/min, 0.1-25 m/min, 0.1-10 m/min, 0.2-50 m/min, 0.2-25 m/min, 0.2-10 m/min, 0.2-8 m/min.

In one embodiment, the method of the present disclosure provides that the aqueous suspension comprises 6-12 wt % of CNC and 88-94 wt % of water.

In one aspect, the aqueous suspension comprises substantially only CNC and water. In one aspect, the aqueous suspension may comprise CNC, water, and one additional organic polymeric material that has reasonable water solubility and can form a composite mixture with CNC in aqueous solution. In one aspect, the organic polymeric material may be but is not limited to poly(vinyl alcohol) (PVA), starch, polyethylene glycol (PEG), poly(ethyleneoxide) (PEO), poly(3-hydroxybutyrate) (PHB), water soluble ethylene-vinylalcohol, cellulose derivatives such as carboxymethylcellulose and hydroxyethylcellulose, natural gums such as xanthan, guar, or Arabic gum, water soluble proteins such as whey or zein, or any derivative/combination thereof.

In one aspect, the aqueous suspension may comprise CNC, water, and one additional water dispersible inorganic polymeric material that may be clays such as but is not limited to Montmorilonite, Laponite, Cloisite, or any combination thereof.

In one aspect, the aqueous suspension may further comprise a plasticizer to make the film more pliable. The plasticizer may be but is not limited to sorbitol, citric acid or glycerol. Comparing to the pure CNC coating, the coating with CNC and a plasticizer improved the $CO_2$ barrier capability by 25-50%.

In one aspect, the ratio of the weight of CNC to the weight of a water soluble polymer or water dispersible inorganic polymeric material such as PVA is at least more than 1.0, in one aspect, the ratio of CNC to the water soluble polymer is about 2:1, 3:1, 4:1, 5:1, 6:1, 9:1, 8:1, 9:1, 10:1, 20:1, 25:1, 50:1, 100:1. When the water soluble polymer is PVA, the preferred CNC/PVA ratio is about 7:3.

In one aspect, a preferred drying temperature range is between 65-85° C. In one aspect, a preferred drying temperature range is between 75-85° C.

In one embodiment, the present disclosure provides a CNC coated flexible substrate wherein the CNC coated flexible substrate comprises anisotropic coating with order parameter of at least 0.2. In one aspect, the anisotropic coating order parameter is at least 0.3, 0.4, or 0.5. In one aspect, the anisotropic coating order parameter is about 0.2-1.0, 0.2-0.95, 0.2-0.9, 0.2-0.8, 0.2-0.7, 0.3-1.0, 0.3-0.95, 0.3-0.9, 0.3-0.8, 0.3-0.7, 0.4-1.0, 0.4-0.9, 0.4-0.8, or 0.4-0.7.

In one embodiment, the CNC coated flexible substrate may comprise more than one layer of CNC coating. In one aspect, the CNC coated flexible substrate comprises 2, 3, 4, 5, 6, 7, 8, 9, or more CNC coatings. In one aspect, the CNC coated flexible substrate comprises 1-100, 1-90, 1-80, 1-70, 1-60, 1-50, 1-40, 1-30, 1-20, 1-10, or 1-5 CNC coatings.

In one embodiment, the CNC coated flexible substrate may comprise one or more coatings with a CNC coating thickness between 100 nm-100 μm, 100 nm-50 μm, 100 nm-30 μm, 100 nm-20 μm, 100 nm-10 μm, 500 nm-100 μm, 500 nm-50 μm, 500 nm-40 μm, 500 nm-30 μm, 500 nm-20 μm, 500 nm-10 μm, 1 μm-100 μm, 1 μm-50 μm, 1 μm-40 μm, 1 μm-30 μm, 1 μm-20 μm, 1 μm-10 μm.

In one embodiment, the flexible substrate may be any plastic like material such as but is not limited to polyethylene (PE), polypropylene (PP), polylactic acid, or even paper sheet. In one aspect, the flexible substrate may be any flexible polyester. In one aspect, the flexible substrate may be any flexible polyester such as but is not limited to polyhydroxyalkanoates such as poly-3-hydroxybutyrate, polyhydroxyvalerate, polyhydroxyhexanoate; polylactic acid polyesters; polybutylene succinate, polycaprolactone, starch and starch derivatives, cellulose esters such as cellulose acetate and nitrocellulose and derivatives thereof (such as celluloid), or polyethylene terephthalate (PET). In one aspect, the flexible substrate is polyethylene terephthalate (PET).

In one embodiment, the CNC coated flexible substrate comprises a substantially transparent CNC coating. In one aspect, the substantially transparent CNC coating does not decrease the transparency of the uncoated flexible substrate by 30%, by 20%, by 10%, by 5%, or by 2.5%.

In one embodiment, the method of the continuous roll-to-roll coating of a flexible substrate may prepare CNC coated flexible substrate with a length of at least 1 meter (m), 10 m, 100 m, 1000 m, 10,000 m, or 100,000 m. In one aspect, the length is about 1-100,000 m, 1-10,000 m, 1-1000 m, 1-100 m, or 1-10 m.

The following experiments and/or examples are for illustration purpose for the present disclosure.

Example 1

CNC Only Coating

Materials and Ink Formulation

Flexible polyester films (MELINEX® 462 2 mil) were purchased from TEKRA (New Berlin, Wis., USA) and used as a substrate. The substrate film, 1000 m in length and 15.24 cm in width, was installed on the roll-to-roll coating system. Never-dried, pristine CNC (12.2 wt %, batch no-2015-FPL-071CNC) aqueous suspension purchased from the University of Maine (Orono, Me., USA) and manufactured by the USDA Forest Service-Forest Products Laboratory (FPL) (Madison, Wis., USA), was used as ink in this investigation. The stock CNC aqueous solution was diluted with nano-pure water to a final concentration of 6 wt %, 9 wt %, and 12 wt % CNC. Solutions were ultra-sonicated for 10 mins to disperse CNCs and homogenize solutions. Sonication introduced fluidity into solutions by destroying its gel structure and enabling their use as an active ink system without any further formulation. The rheological measurements of the CNC suspension were performed on a shear controlled rotational rheometer (Malvern Bohlin Gemini HR Nano) equipped with a cup and bob fixture. The steady shear viscosity was measured for 100 μm gap distance and the shear rate range was 0.01-500 $s^{-1}$. All measurements were performed at room temperature.

Substrate and Ink Compatibility

Substrate-ink compatibility is the most important parameter for any printing or coating technique. In general, the surface energy of the substrate must be higher than the surface tension of the ink system. Flexible polyester films have lower surface energy (45 dynes/cm) compared to CNC dispersion surface tension (60-65 Dynes/cm) (Gardner et al.

2008); hence, surface treatment is essential to overcome de-wetting issue. We utilized a high speed, high power corona treater system (QC electronics, Inc.) for substrate processing, which introduced a surface modification to increase the wettability of the substrate roll. Treatment speed rate as well as power supply dominated the overall surface modification. We observed that a substrate treatment with a 0.5 KW power supply and 2 m/min speed rate can produce 60-65 dynes/cm surface energy on the film, which is compatible with an aqueous CNC suspension.

Film Fabrication

A Mirwec Mini-Labo Deluxe™ system with a tri-helical (mesh R30) microgravure system has been utilized for our gravure coating. The gravure coating includes a gravure roller, ink bath, flexible substrate, and drying chamber. A doctor blade was placed over the gravure cylinder to remove the excess ink and maintain a uniformly solution thickness. The nip distance was minimized between the gravure and the substrate to achieve complete liquid transfer. Fabrication processes were performed with a variable substrate speed (0.3-6 m/min), and gravure speed (4 rpm-70 rpm), which controlled the overall coating thickness and quality. After a successful liquid transfer from the ink bath to the flexible substrate, the wet-coated region passed through an inline drying unit. The temperature of the heating chamber was 80° C. for the entire gravure coating process, which allows for complete drying of the coating. After drying, the transparent CNC coated substrate was collected on the rewinder.

Film Characterization

A Carl Zeiss (Axio observer A1) inverted light microscope was used in transmission mode for thickness measurements. Both 5× and 10× magnification objectives were used for film thickness characterization. A cut sample was placed perpendicularly between the objective and the stage and film thickness was measured. Polarized light optical microscopy was used to image coatings with samples at 45° and 90° with respect to the plane of polarized light.

The transparency of neat PET and CNC coated PET films were measured with a conventional UV-Vis spectrophotometer (Spectramax Plus 384, Molecular devices Corp., Sunnyvale, Calif.). The transmittance data for each film were measured across 400-750 nm wavelength with air as the background.

Anisotropy Measurement

A conventional UV-vis spectrophotometer (Spectramax Plus 384, Molecular devices Corp., Sunnyvale, Calif.) was used for the characterization of the CNC alignment. A similar method was reported by Chowdhury et al. See Chowdhury et al., Improved order parameter (alignment) determination in cellulose nanocrystal (CNC) films by a simple optical birefringence method Cellulose, 2017, 24:1957-1970. Briefly, a sample was delaminated from the substrate and placed between a cross polarizer and the transmitted light intensity was measured at 45° and 90° configurations. The transmittance data was recorded from 400 nm to 750 nm wavelength. The following equations were used for the order parameter, S calculation:

$$I = I_0 \sin^2 2\theta \sin^2\left(\frac{\pi \Delta n d}{\lambda}\right) \quad (1)$$

So $$\frac{I_{45}}{I_{90}} = \frac{I_0 \sin^2(2*45)\sin^2\left(\frac{\pi \Delta n d}{\lambda}\right)}{I_0 \sin^2(2*90)\sin^2\left(\frac{\pi \Delta n d}{\lambda}\right)}$$

Hence, $$\frac{I_{45}}{I_{90}} = D^* = D \cdot g = \frac{(2S+1)}{(1-S)} \quad (2)$$

Here, $I_0$, $\theta$, $\Delta n$, $d$, $\lambda$, $g$ and $D$ represent the amplitude of the incident light, the angle of the material between the cross-polarizer, refractive index difference, film thickness, wavelength, transmitted light intensity, correction factor and dichroic ratio, respectively. The parallel and perpendicular refractive indices are relatively low for cellulose; therefore, we adopt g=1 for our calculation. The order parameter for any material is between 0 and 1, where S=0 is defined as an entirely random/isotropic configuration and S=1 is for a perfect anisotropic arrangement.

Surface Morphology

A Dimension 5000 Atomic force microscope (AFM) in contact mode was used to examine surfaces of organic coatings on the polyester substrate. Samples were prepared by cutting a section of the film from the middle of the coated section and adhering the strip to a metal puck. Two samples were selected for each condition (6 wt %, 9 wt %, and 12 wt %) and three sections on each sample imaged. Films were fabricated under the same conditions at a speed ratio of 1. Films for AFM imaging showed no visual signs of defects.

Adhesion Test

CNC coating adhesion to the flexible substrate was studied with a cross-hatch adhesion test method (ASTM-D3359). Briefly, a 5×5 cm specimen was adhered to a glass plate with adhesive spray and left untouched for 30 mins for complete drying. With a sharp blade, 11 parallel and 11 perpendicular cuts were made on the sample with respect to the center of the film, where each cut was 1 mm apart. A pressure sensitive tape was placed over the film for 5 mins and removed from the surface at a 180° angle. Both the flexible substrate and CNC coating were colorless, so the removal of the CNC coating from the grid area was investigated by polarized light microscopy.

Coating Thickness Control

Parameters such as micro-gravure speed, substrate speed, speed ratio, capillary number, and CNC concentration collectively control the liquid transfer rate of this fabrication process. A thick liquid layer is the first requirement for maximum liquid transfer from the gravure to the substrate. The liquid thickness solely depends on a stable and continuous liquid bridge formation between the gravure and substrate. However, stretching and shear forces also exist in this liquid bridge which can destabilize it; these forces can be controlled by gravure roller and web speeds. The data regarding the coating thickness dependence on experimental parameters is presented in the tables 1-3 for each CNC concentration examined.

TABLE 1

6 wt % CNC suspension speed variables, capillary number, and thickness

| Uroll, m/min | Uweb, m/min | Speed ratio | Ca | Thickness, μm |
|---|---|---|---|---|
| 0.504 | 1.000 | 0.504 | 7.8154e−3 | 2.06 ± .2 |
| 0.693 | 1.000 | 0.693 | 7.0277e−3 | 2.08 ± .48 |
| 1.008 | 1.000 | 1.008 | 6.2400e−3 | 2.45 ± .21 |
| 2.016 | 1.000 | 2.016 | 5.8385e−3 | 2.42 ± .54 |
| 4.095 | 1.000 | 4.095 | 6.5577e−3 | 3.1 ± .31 |
| 0.630 | 1.250 | 0.504 | 8.2385e−3 | 2.1 ± .35 |

TABLE 1-continued 6 wt % CNC suspension speed variables,
capillary number, and thickness

| Uroll, m/min | Uweb, m/min | Speed ratio | Ca | Thickness, μm |
|---|---|---|---|---|
| 0.630 | 0.960 | 0.656 | 6.9308e−3 | 2.1 ± .32 |
| 0.630 | 0.630 | 1.000 | 5.6231e−3 | 2.8 ± .21 |
| 0.630 | 0.450 | 1.400 | 4.8385e−3 | 2.9 ± .32 |
| 0.630 | 0.310 | 2.032 | 4.0538e−3 | 3.1 ± .15 |
| 1.033 | 1.010 | 1.023 | 6.3702e−3 | 2.7 ± .44 |
| 0.882 | 0.880 | 1.002 | 5.9400e−3 | 2.5 ± .38 |
| 0.762 | 0.760 | 1.003 | 5.7012e−3 | 2.09 ± .31 |
| 0.630 | 0.630 | 1.000 | 5.6231e−3 | 2.05 ± .24 |
| 0.504 | 0.500 | 1.008 | 4.7938e−3 | 1.9 ± .41 |
| 2.016 | 1.010 | 2.000 | 6.1498e−3 | 3.39 ± 0.30 |
| 1.764 | 0.880 | 2.005 | 7.9920e−3 | 3.25 ± 0.58 |
| 1.512 | 0.756 | 2.000 | 6.2954e−3 | 2.94 ± 0.42 |
| 1.298 | 0.650 | 1.997 | 5.4718e−3 | 2.88 ± 0.50 |
| 1.021 | 0.510 | 2.001 | 4.8096e−3 | 2.75 ± 0.29 |

TABLE 2

9 wt % CNC suspension speed variables,
capillary number, and thickness

| Uroll, m/min | Uweb, m/min | Speed ratio | Ca | Thickness, μm |
|---|---|---|---|---|
| 0.504 | 1.000 | 0.504 | 0.0313 | 2.86 ± 0.32 |
| 0.693 | 1.000 | 0.693 | 0.0307 | 3.20 ± 0.48 |
| 1.008 | 1.000 | 1.008 | 0.0364 | 3.60 ± 0.31 |
| 2.016 | 1.000 | 2.016 | 0.0311 | 3.80 ± 0.52 |
| 4.095 | 1.000 | 4.095 | 0.0525 | 4.10 ± 0.48 |
| 0.630 | 1.230 | 0.512 | 0.0339 | 2.60 ± 0.31 |
| 0.630 | 0.920 | 0.685 | 0.0285 | 2.80 ± 0.32 |
| 0.630 | 0.640 | 0.984 | 0.0232 | 3.50 ± 0.40 |
| 0.630 | 0.460 | 1.370 | 0.0199 | 4.10 ± 0.41 |
| 0.630 | 0.350 | 1.800 | 0.0167 | 4.20 ± 0.43 |
| 1.033 | 1.010 | 1.023 | 0.0337 | 3.59 ± 0.54 |
| 0.882 | 0.880 | 1.002 | 0.0320 | 3.70 ± 0.54 |
| 0.762 | 0.760 | 1.003 | 0.0285 | 3.55 ± 0.50 |
| 0.630 | 0.630 | 1.000 | 0.0232 | 3.01 ± 0.54 |
| 0.504 | 0.500 | 1.008 | 0.0227 | 2.90 ± 0.43 |
| 2.016 | 1.008 | 2.000 | 0.0311 | 4.66 ± 0.46 |
| 1.764 | 0.880 | 2.005 | 0.0342 | 4.4 ± 0.63 |
| 1.512 | 0.756 | 2.000 | 0.0286 | 4.59 ± 0.62 |
| 1.298 | 0.650 | 1.997 | 0.0251 | 4.11 ± 0.72 |
| 1.021 | 0.510 | 2.001 | 0.0231 | 4.37 ± 0.37 |

TABLE 3

12 wt % CNC suspension speed variables,
capillary number, and thickness

| Uroll, m/min | Uweb, m/min | Speed ratio | Ca | Thickness, μm |
|---|---|---|---|---|
| 0.504 | 1.000 | 0.504 | 0.0625 | 4.38 ± 0.29 |
| 0.693 | 1.000 | 0.693 | 0.0615 | 4.5 ± 0.43 |
| 1.008 | 1.000 | 1.008 | 0.0572 | 4.72 ± 0.48 |
| 2.016 | 1.000 | 2.016 | 0.0584 | 4.94 ± 0.27 |
| 4.095 | 1.000 | 4.095 | 0.0787 | 6.27 ± 0.52 |
| 0.630 | 1.260 | 0.500 | 0.0727 | 3.72 ± 0.19 |
| 0.630 | 0.950 | 0.663 | 0.0612 | 4.16 ± 0.32 |
| 0.630 | 0.630 | 1.000 | 0.0496 | 4.94 ± 0.29 |
| 0.630 | 0.470 | 1.340 | 0.0427 | 5.08 ± 0.41 |
| 0.630 | 0.320 | 1.969 | 0.0358 | 5.41 ± 0.52 |
| 1.033 | 1.010 | 1.023 | 0.0579 | 4.38 ± 0.26 |
| 0.882 | 0.880 | 1.002 | 0.0548 | 4.22 ± 0.19 |
| 0.762 | 0.760 | 1.003 | 0.0532 | 3.94 ± 0.27 |
| 0.630 | 0.630 | 1.000 | 0.0496 | 3.72 ± 0.26 |
| 0.504 | 0.500 | 1.008 | 0.0404 | 3.72 ± 0.21 |
| 2.016 | 1.008 | 2.000 | 0.0584 | 5.05 ± 0.47 |
| 1.764 | 0.880 | 2.005 | 0.0546 | 4.94 ± 0.40 |
| 1.512 | 0.756 | 2.000 | 0.0492 | 4.94 ± 0.38 |
| 1.298 | 0.650 | 1.997 | 0.0487 | 5.08 ± 0.55 |
| 1.021 | 0.510 | 2.001 | 0.0423 | 5.20 ± 0.42 |

At a constant web speed, coating thickness increases with increasing roller speed and increasing CNC concentration. By doubling the CNC concentration from 6 wt % to 12 wt % the coating thickness approximately doubled for roller speeds less than 4 m/min. Similarly, the 9 wt % is approximately 1.5 times greater than the 6 wt % coatings. For these conditions, solid loading of the CNC nanoparticles in the ink primarily appeared to control coating thickness. However, the viscosity and therefore capillary number, which increases monotonically with viscosity, are also expected to contribute to coating thickness as these parameters should theoretically improve the liquid transfer rate. At higher roller speeds, the capillary number for 12 wt % is 12 times higher than 6 wt % CNC suspensions, and coating thicknesses greater than twice the 6 wt % coatings were achieved. At the higher roller speeds, the increase in thickness may be owing to the significant increase in capillary number and hence better liquid transfer rate from the roller to the substrate. While the 9 wt % concentration followed a similar liquid transfer behavior to the 12 wt % CNC suspension, the 6 wt % CNC displayed the lowest capillary numbers for this system; hence, the liquid ink exhibits Newtonian behavior and follows a symmetrical liquid bridge breakup. Consequently, a Newtonian liquid cannot de-wet completely from the gravure cell cavity resulting in low ink transfer and therefore, low coating thickness.

On the other hand, constant roller rotation with a variable web speed demonstrates the opposite behavior due to the reduced liquid transfer rate. At a low web speed, the roller can rotate more than one time over the web surface resulting in the maximum coating thickness at low web speeds. However, liquid transfer rate reduces gradually with increasing web speed, therefore lowering the coating thickness. In general, the direction of the stretching force should be along the web direction, and the inertia force of the liquid will be along the roller direction. Both are altered by changing the web speed. At higher web speed, the inertia force dominates the stretching force, which facilitates a lower liquid transfer rate to the web surface. For variable web speed, increasing concentration from 6 wt % to 9 wt % and 12 wt % did not produce coatings with respective thickness 1.5 to 2 times greater, therefore, viscous and inertia forces dominated solids loading.

The speed ratio (defined as web speed divided by roll speed) is a critical parameter dependent upon on the roller and substrate speeds, where the capillary number of the liquid suspension controls the liquid transfer rate for the fabrication process. The thickness of the resultant films, and therefore liquid transfer rate from the ink bath to the substrate, increased by a small amount with increasing speed ratio for all CNC concentrations. The liquid transfer rate also depends on the viscous force and inertia force where viscous forces must dominate the inertia force to increase the coating thickness. At a lower speed ratio (0-0.5), the viscosity of the 12 wt % CNC suspension is very high compared to the other concentrations. So, liquid transfer rate must be higher for the 12 wt % suspension based on capillary number alone. Similarly, 9 wt % has a higher viscous force compared to the 6 wt % suspension and resulted in a higher transfer rate and overall higher coating thickness than the lowest concentration. Due to the extremely shear thinning nature of CNC dispersions, increasing shear rate (governed by increasing gravure rotation) will reduce ink viscosity significantly, which will reduce the liquid transfer rate at the higher speed ratio region. At this reduced viscosity, all CNC concentrations behave as Newtonian fluids in which symmetrical liquid bridge formation is the liquid transfer mechanism. Moreover, in the high-speed ratio region, the capillary number is also reduced because of the reduction in suspension viscosity at high shear rates. The reduction of the capillary number and symmetrical liquid bridge formation are the primary reasons for steady state liquid transfer at high speed ratios where the sample thickness begins to asymptote for all suspensions.

The highest concentration suspension (12 wt %) shows a wider region of coating thickness with increased gravure rotation compared to the 6 wt % and 9 wt % counterparts. Speed ratios from 2 to 3.2 show a highly defected coating and so are of limited utility. However, defect-free coatings with reduced thickness were observed at lower speed ratios and higher web speeds. The 9 wt % CNC suspension shows a much smaller region for the thickest coatings with slow gravure rotation. It appears that the maximum liquid transfer rate can be attributed to higher viscosity ink systems.

Effect of Film Thickness on Coating Adhesion

Samples of various coating thicknesses were subjected to crosshatch adhesion tests to measure coating adhesion. Adhesive bonding within the coating and at the coating-substrate interface varies with the coating thickness. Since visual inspection of de-bonding on transparent coated PET film was challenging; polarized light was used to quantify the adhesion loss of CNC coatings. Samples were illuminated between crossed polarizers, and the damaged area was identified based on the color contrast. The quantification of the adhesion loss via coating performance was categorized on a scale of 0-100%. Based on the ASTM D3359, samples were classified into 6 different categories as follows: 5B (0%), 4B (less than 5%), 3B (5-15%), 2B (15-35%), 1B (35-65%) and 0B (>65%) where 5B is considered optimal with 0% area removed from the substrate.

CNC coatings exhibit high peel strength from the PET substrate. Substrate-coating interaction plays a significant role in the peeling strength and is determined by the surface energy and surface tension of the substrate and ink (CNC dispersion in water), respectively. Hence, a highly wettable coating shows very strong adhesion. Corona or plasma treated PET substrates, which have a higher surface energy and therefore are more wettable, show much higher adhesive strength compared to untreated PET substrates. A similar behavior was also observed for the crosshatch experiments here since a corona treatment was applied to the PET substrate.

Coating adhesion displays a strong dependence on coating thickness despite lowering the surface energy difference at the interface through surface treatment. The total coating thickness from 6 wt % CNC suspension was between 2-3 μm, and no delamination was observed for this coating thickness range. Increasing the CNC concentration to 9 wt % CNC suspension increases the final coating thickness to 3.5-4.5 μm and coincides with the onset of delamination in the adhesion test of coated films and therefore a decrease in coating performance. Furthermore, CNC coatings produced with the 12 wt % CNC suspension (4.5-6 μm total thickness) demonstrate the lowest adhesive rating compared to 6 wt % and 9 wt % suspension. The cohesive strength of the bulk CNC coating, and the adhesive strength between the substrate-coating interfaces can explain the above observation. As a rule of thumb, a reduced coating thickness along can improve the coating performance. As the final coating thickness depends on the initial CNC concentration, thinnest coatings produced by the 6 wt % suspension, possessed the maximum peel strength. Theoretically, the cohesive strength should not change significantly for any thickness difference; moreover, the adhesive strength at the interface is independent of the coating thickness. It was expected the adhesive rating to be similar for all CNC concentrations, but, it was unexpectedly observed delamination for 9 wt % and 12 wt % CNC suspension based coating. Fabrication defects present on the surface and in bulk coating regions, which strongly depend on film thickness, may initiate cracks in the coating that result in delamination. As well, there may be residual stress in the films owing to their rapid drying and low solids gel point.

The mechanism of defect formation in roll-to-roll system strongly depends on the viscosity and capillary number of the ink system. Here, high viscosity liquids (9 wt % and 12 wt %) will have higher capillary numbers. Higher capillary number fluids can entrap air bubbles on the gravure, which can lead to different coating defects. Moreover, high-speed gravure rotation of a viscous ink system can also produce air bubbles in the ink bath which in turn may produce defects in thicker coating samples not present in thinner coatings. The presence of a volume defect like cavitation can reduce the adhesive bond between the interfaces and therefore reduce the adhesive strength which results in delamination or de-bonding at higher coating thicknesses.

Effect of CNC Concentration on Surface Morphology and Optical Transparency

Surface morphology varied greatly with CNC concentration. As CNC concentration was increased, the surface roughness was seen to increase. Both the 9 wt % and 12 wt % surface morphologies were considerably rougher compared to the 6 wt % suspension, which is reflected in $R_q$, the root mean squared height deviation, of Table 4. The presence of groove or current-like morphologies in the 9 wt % indicate a strong directional dependence of the surface morphology. The direction of the grooves approximately coincides with the 0-20° orientation introduced by the gravure tilt along the direction of shear. For highly viscous suspensions like the 9 wt % and 12 wt % the relaxation time is longer and so solutions will retain more orientation during processing, as seen with the order parameter in the subsequent section, in the rolling direction. The scale and frequency of this morphology are both too small to be gravure patterning. The unique appearance may be a result of local de-wetting of the suspension from the surface similar to microscale defects seen at higher speed ratios. While the 12 wt % is still rough, it did not exhibit a strong direction dependence did in the areas examined. It did have several pockets, which may be the result of cavitation. Cavitation can occur when air becomes entrapped in a viscous solution and is transferred to the surface. The 6 wt % exhibited small variation in sample roughness, see Table 4. This is not surprising as the suspension behaved as a Newtonian fluid and has a fast relaxation time compared to the 9 wt % and 12 wt %. In particular, the maximum vertical height difference, Rmax, and Rq were proximately twice as large for the 9 wt % and 12 wt % CNC coatings compared to the 6 wt %. Increased surface roughness creates a stronger adhesive bond between the coating and the tape in the peel test by strengthening the mechanical bond between the surface and tape. Increased surface roughness can be problematic as defects and uneven surfaces are sites for failure. The increased roughness of the higher suspensions may be one reason the 9 wt % and 12 wt % adhesion performance was not as high compared to the 6 wt %.

TABLE 4

Roughness measurements as a function of CNC content

| CNC Content (wt %) | $R_q$ (nm) | $R_{max}$ (nm) |
|---|---|---|
| 12 | 12.4 ± 02.11 | 98.40 ± 25.84 |
| 9 | 13.00 ± 2.07 | 104.9 ± 12.83 |
| 6 | 5.87 ± 0.38 | 53.0 ± 33.52 |

$R_q$: Root mean squared deviation in height;
$R_{max}$ = Maximum vertical height difference.

Surface morphology is indicative of the liquid transfer efficiency as well. A liquid bridge exists between the gravure and the substrate in which ink is transferred. Across this liquid bridge there can be a surface tension gradient which will help drive liquid transfer. If the surface tension of the liquid is minimized by wetting the substrate, it will do so. A reasonable expectation is that the surface morphology would be smooth and flat if surface tension favors the transfer of the ink to the substrate. However, viscous forces will be competing against surface tension. As the viscosity of the liquid increases the capillary number increases. For high viscosity, high Ca, the viscous forces will dominate surface tension effects in flow behavior and the surface may still appear rough despite liquid transfer being a favorable process. In the present study, the capillary number is increasing with increasing CNC concentration which may explain why surface roughness is increasing significantly despite favorable wetting conditions after corona treatment and layer-by-layer coating.

Exceptional optical transparency was obtained for CNC coated PET films. Flexible PET demonstrated 89-92% transparency for a wavelength range from 400-750 nm, while CNC coating transparency degraded only 2% compared to the bare substrate. Of the CNC coatings, the 12 wt % transparency was 1.5% lower than the 6 wt % and 9 wt %. The presence of defects (due to a higher capillary number and gravure rotation) or higher surface roughness in 12 wt % CNC coating may be responsible for the slight decrease. The diffuse reflection of incident light is promoted by surface roughness and may cause light scattering, reducing the ultimate transparency of the 12 wt % film. Moreover, edges of defects can cause diffraction of the incident light and therefore also; reduction of transparency.

Gravure Rotational Effect on Anisotropy

The crystalline domain arrangement (anisotropy, in this case) is largely determined by the combined action of the shear rate and domain retention time, which depends on the gravure rotation and the rheology of the CNC solution. To calculate Herman's order parameter, S, light transmittance of free-standing CNC films was measured. Films were created by varying gravure rotation (which determines shear rate) and CNC concentration at 6 wt %, 9 wt %, and 12 wt %. A minimum of four layers were used to achieve coatings of 16-20 μm in thickness which could be delaminated from the PET substrate for light transmittance measurements. The transmitted light intensity profile for 45° and 90° configurations were measured for the determination of the linear dichroic ratio, D, that can be related to the order parameter, S, for each CNC film through equation 2. The maximum transmitted light intensity increases with increasing CNC ink concentration for the 45° configuration while the 90° configuration is generally decreasing (Table 5). D, calculated as the ratio of the maximum transmitted intensity between the 45° and 90° configurations, increases from 1.79 for the 6 wt % up to 4 for the 12 wt % and fixed shear rate. This suggests that preferential alignment of the crystalline domains along the shear direction is improved by increasing CNC concentration. D is maximized for the 12 wt % samples which implies that the difference in refractive index for longitudinal and transverse directions is also highest for the 12 wt % compared to the other concentrations.

TABLE 5

Dichroic ration from maximum transmittance intensity for different specimen and resulted Herman order parameter (S)

| CNC concentration | Transmittance light intensity for 45° configuration | Transmittance light intensity for 90° configuration | Dichroic ratio | Order parameter |
|---|---|---|---|---|
| 6 wt % | 21.3 | 11.9 | 1.79 | 0.21 |
|  | 22.9 | 13.5 | 1.70 | 0.19 |
|  | 27.4 | 14.1 | 1.94 | 0.24 |
|  | 23.3 | 12.32 | 1.89 | 0.23 |
|  | 30.1 | 15.1 | 2.05 | 0.26 |
| 9 wt % | 34.2 | 11.4 | 3.00 | 0.40 |
|  | 38.6 | 11.4 | 3.40 | 0.45 |
|  | 40.1 | 10.6 | 3.80 | 0.49 |
|  | 31.4 | 8.5 | 3.70 | 0.48 |
|  | 36.7 | 10.2 | 3.60 | 0.47 |
| 12 wt % | 40.6 | 10.2 | 4.00 | 0.50 |
|  | 37.9 | 8.2 | 4.60 | 0.55 |
|  | 42.6 | 6.5 | 6.50 | 0.65 |
|  | 44.9 | 8.2 | 5.50 | 0.60 |
|  | 38.6 | 8.4 | 4.60 | 0.55 |

An increasing order parameter as a function of gravure rotation/shear rate is observed and likely due to shear-induced alignment of the CNCs during the gravure process. At a low shear rate of 80 s$^{-1}$, 12 wt % films show an order parameter of ~0.5. As anticipated, an increase in shear rate enhances domain alignment along the shear direction, but only by a modest amount. A maximum order parameter of 0.65 is achieved at 170 s$^{-1}$ shear rate for the 12 wt %. However, a negligible reduction in the anisotropy of the CNC coating is observed at the higher gravure rotation, and the order parameter is almost constant at the elevated shear rate region. On the other hand, 9 wt % samples show less anisotropy at any gravure rotation and increasing the shear rate had a smaller effect on the domain alignment. No anisotropic properties was observed in 6 wt % CNC samples. Regardless, in at all concentrations, the natural chiral nematic domain structure was sufficiently disturbed to allow for high transparency.

The crystalline domain of the anisotropic CNC coating must align its crystal position along the shear direction during coating and the relaxation time for the CNC domain movement should be lengthy. Thus, the initial CNC concentration contributes to alignment. A low concentration CNC suspension behaves like a Newtonian fluid and the domains show a fast relaxation time after applying shear. With enough time domains show a highly isotropic configuration. However, the Newtonian nature may also limit orientation in the first place. It is seen in 6 wt % CNC suspension that very little alignment remains even after only 5 s of relaxation. However, at 9 wt %, it known that CNC domains can be aligned along the shear direction. However, in previous work, the anisotropy was completely destroyed after 5-10 mins despite having achieved 50% alignment for a 9 wt % concentration. See Haywood et al., Effects of liquid crystalline and shear alignment on the optical properties of cellulose nanocrystal films Cellulose, 2017 24:705-716. In the present disclosure, 1 m/min web speed was used. And the ink bath to drying unit distance was 50 cm. So the time before drying is 30 secs. Assuming a zero time to dry once it enters the oven, then the long relaxation time as compared to the dry time would lead to a high alignment retention, so ~50% anisotropy is logical considering the previous work getting similar results with simple shear. Similarly, the alignment of the 12 wt % CNC suspension has a relaxation time of 30 mins, but again, is locked into place in 30 s so the even higher order parameter (S=0.65) is achieved. Little disorientation was observed over this time scale.

Example 2

CNC-PVA Composite

Materials and Methods

Poly(vinyl alcohol) 89-98K with 98% hydrolysis were purchased from sigma Aldrich. Never dried, pristine CNC (12.2 wt % batch no-2015-FPL-71 CNC) aqueous suspension that contains 1% sulphur and a sodium counter ion, was purchased from University of Maine and manufactured by the USDA-US Forest Service-Forest Products Laboratory (FPL) (Madison, Wis., USA) (Reiner & Rudie, 2013). All materials were used as active ink ingredients without any purification. A stock solution of 12 wt % PVA suspension was prepared by adding 36 g of PVA in 300 g water and heated for 3 hrs at 120° C. Stock solution of CNC (12% in water) was added to the PVA solution at a fixed concentration to produce the final compositions. The final compositions of different CNC-PVA coating ratios are shown in Table 6. Before fabrication, all ink suspensions were ultrasonicated (Branson Ultrasonics, Danbury, Conn., USA) for 3 mins (at 50% amplitude with a 1 s plus and 1 s rest at 60 Hz frequency) to disperse CNCs and homogenized solution. Flexible PET, MELINEX® 462 2 mil (TEKRA) and PLA films (Cargill Dow LLC) were used as substrates for the coating process.

TABLE 6

Coating formulations for different compositions for CNC-PVA

| Composition | 12 wt % CNC suspension, g | 12 wt % PVA suspension, g | Film thickness on PET, μm | Film thickness on PLA, μm |
|---|---|---|---|---|
| PVA | 0 | 100 | 5.8 ± .33 | 1.93 ± .09 |
| CNC: PVA (25:75) | 25 | 75 | 4.6 ± .47 | 1.8 ± .23 |
| CNC: PVA (50:50) | 50 | 50 | 4.7 ± .25 | 1.58 ± .13 |
| CNC: PVA (70:30) | 70 | 30 | 4.3 ± .15 | 1.57 ± .15 |
| CNC: PVA (90:10) | 90 | 10 | 4.2 ± .21 | 1.47 ± .15 |
| CNC | 100 | 0.0 | 3.8 ± .06 | 1.23 ± .09 |

Rheological measurements for CNC-PVA suspensions were performed with a Malvern Bohlin Gemini HR Nano rheometer. A cup and bob fixture with 100 μm gap distance was used for each experiment. All measurements were performed with a variable shear rate (0.1-500 $s^{-1}$) at room temperature.

Surface Tension Measurements

Surface tension measurements were obtained at the ink/air interface by pedant drop tensiometry. A Ramé-Hart contact angle goniometer with DROPimage Advanced software (Model 500) was used for this characterization. The geometrical profile of the static pedant drop was compared with the theoretical (Laplace equation) drop profile. All measurements for various ink compositions were performed at room temperature and humidity.

Coating Equipment and Conditions

A Mirwec Mibi-Labo Delux™ system with a trihelical (mesh R30 and mesh R90) microgravure system was utilized for coating fabrication. Gravure roller, ink batch, doctor blade, flexible substrate and a drying chamber are the major components for this instrument (Figure S1). The gravure roller was placed with an ink bath that continuously transferred ink from an ink bath to the substrate. A doctor blade with 50 μm gap distance was placed over the gravure roller which continuously removed excess ink from the gravure roller, thus producing uniform coating thickness. The fabrication process was performed at 1 m/min substrate speed with 30 rpm gravure rotation. Two temperatures were used for this fabrication based on the heat deflection temperature of the substrate. Coating on the substrates was performed at 80° C. and 45° C. for PET and PLA, respectively.

Both PET and PLA substrates have low surface energy compared to the surface tension of the ink system. As a result, a surface treatment of the substrate was essential to overcome de-wetting (caused by ink/substrate incompatibility). A high power corona discharge system (QC electronics, Inc.) was used for substrate processing. A 0.5 KW power supply with 0.5 m/min substrate speed rate was sufficient to increase the substrate surface energy (60-65 dyne/cm) and enhance ink/substrate compatibility.

Film Characterization

A conventional UV-Vis spectrophotometer (Spectramax Plus 384, Molecular devices Corp., 133 Sunnyvale, Calif.) was used for the transparency measurements. All measurements were performed between 350-750 nm wavelength ranges with air as the background. Coating thickness of the samples were observed by a scanning electron microscopy (SEM, Pro X, Phenom). Before imaging, an electrically conductive thin layer of gold coating was sputtered on the specimen.

A conventional UV-Vis spectrophotometer (Spectramax Plus 384, Molecular devices Corp., 133 Sunnyvale, Calif.) was used for the transparency measurements. All measurements were performed between 350-750 nm wavelength ranges with air as the background. Coating thickness of the samples were observed by a scanning electron microscopy (SEM, Pro X, Phenom). Before imaging, an electrically conductive thin layer of gold coating was sputtered on the specimen.

Excellent optical transparency was observed for CNC-PVA coatings on the flexible PET substrate. The uncoated PET substrate showed 89-92% optical transparency for a wavelength range of 350-750 nm. There was no significant transmittance reduction for any CNC-PVA composition relative to the uncoated PET film. Therefore, different coating compositions have minimal light scattering and reflection. This high transparency is important in commercial applications particularly in food packaging where clear display of the food product is required.

Effect of CNC Loading on Coating Anisotropy

Figure 1:
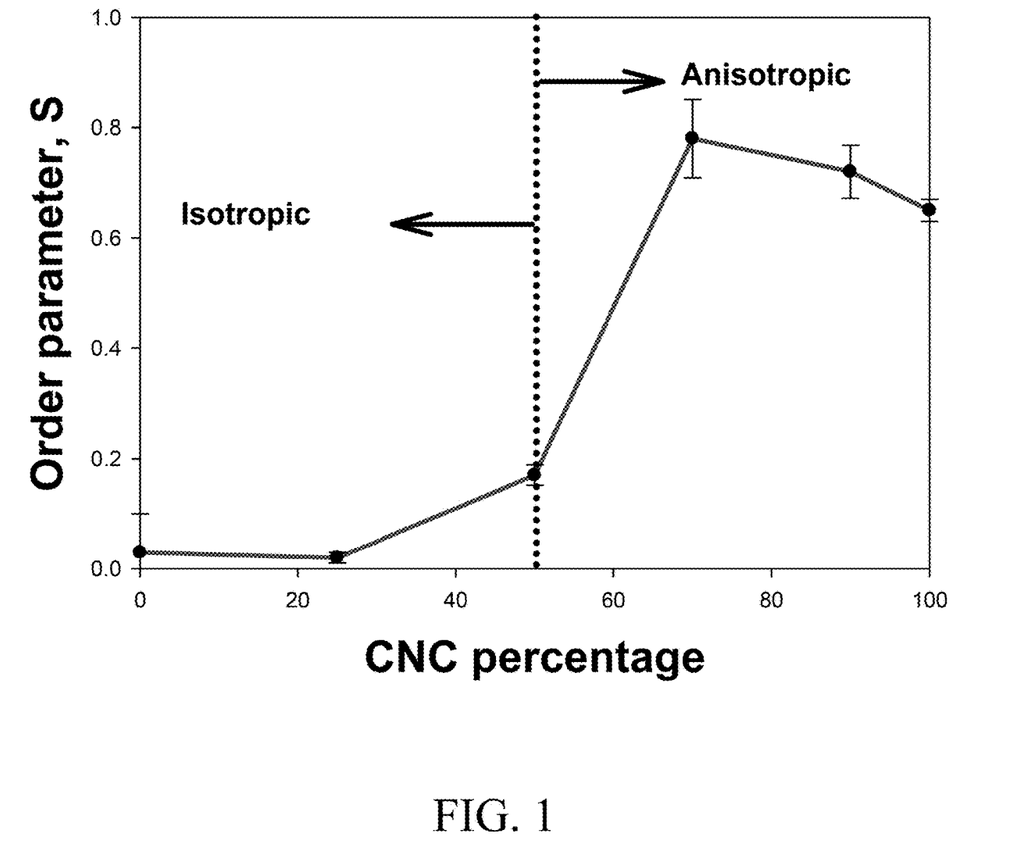
FIG. 1: Order parameter for different CNC-PVA coating system.

For a constant shear rate (approximately 300 $s^{-1}$), it is observed from FIG. 1 that CNC loading controls the overall anisotropy of the CNC-PVA coatings. At 0-50% CNC loading in the dry film, the ink system mostly displayed an isotropic arrangement. However, there was a sudden increase in anisotropy up to a maximum order parameter of 0.78 at 70% CNC loading. The anisotropy was steady up to a 90% CNC loading. Finally, the order parameter reduced to 0.65 for pure CNC coating.

Figure 2:
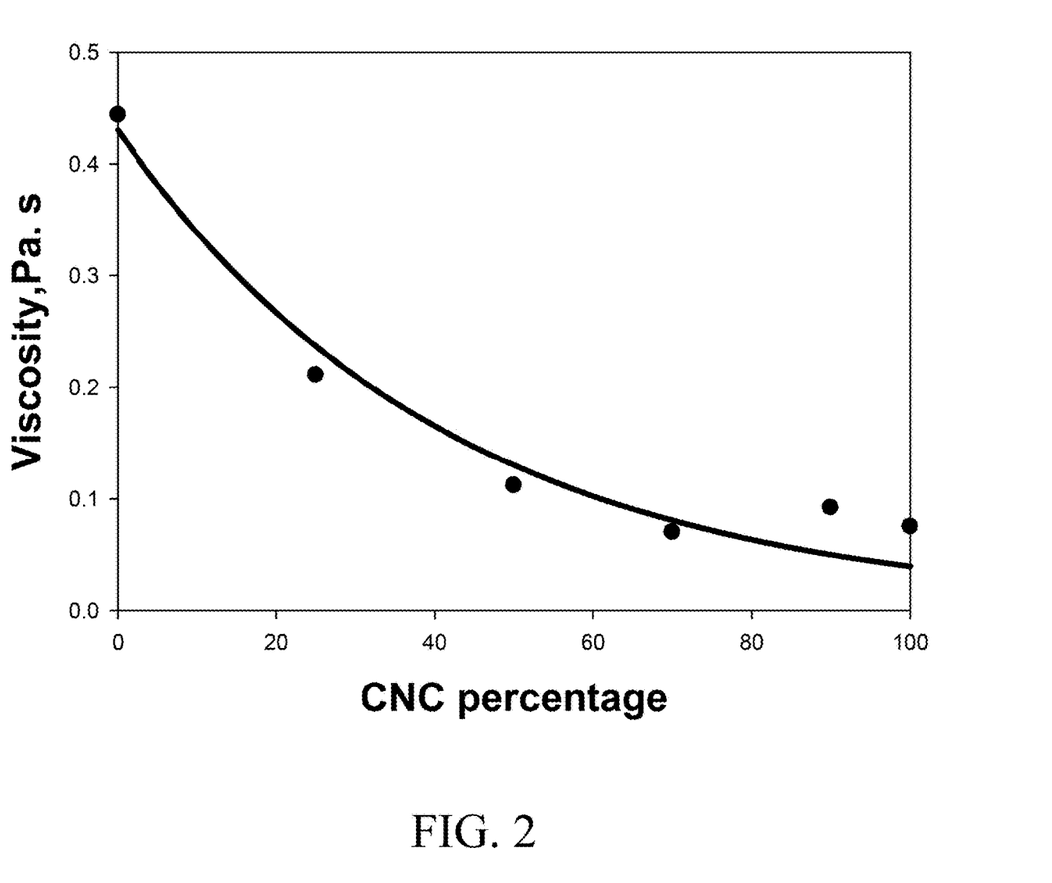
FIG. 2: Apparent viscosity for CNC-PVA (12 wt % solid loading) nanocomposites system with different CNC percentage at 300 $s^{-1}$ shear rate (line added to aid the eye).
Figure 3:
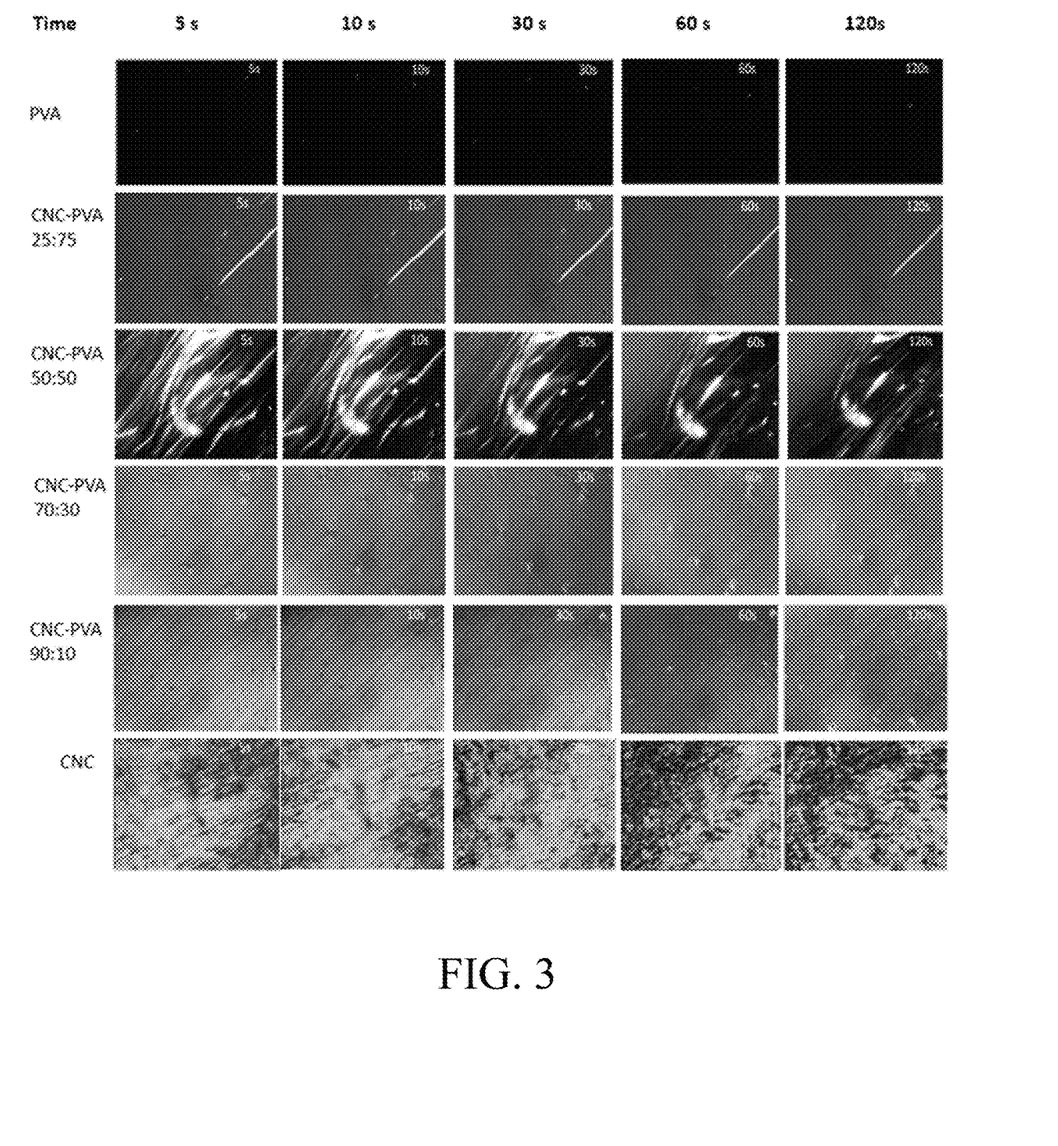
FIG. 3: Real time birefringence observation for different coating formulations.

In the aqueous system, due to its long chains, PVA has a swollen gel structure with many entanglements. Hence, shear alignment must be difficult for the PVA solution. Therefore, the CNC is the key factor for the coating anisotropy, whose alignment is determined by the combined effect of shear rate and crystalline domains retention time. The shear rate depends on the gravure rotation. However, a constant gravure rotation was used for this fabrication, so the overall coating anisotropy should mainly depend on the CNC content and the domain relaxation time. The relaxation time for CNC movement is determined by the viscosity of the ink system. More viscous ink systems are expected to exhibit higher relaxation times as compared to less viscous ones. As viscosity is decreased with increased CNC percentage (FIG. 2), it is expected that higher CNC loading ink should have a faster relaxation time thus corresponding with a lower order parameter. However, highly anisotropic coatings were observed at higher CNC loadings even though ink viscosity decreased compared to lower CNC percentage loading. For CNC loading less than 50 wt %, the applied shear rate (300 s$^{-1}$) may not be sufficient to produce an anisotropic coating. This could be due to the entrapment of the CNC domains in the globular structure of the PVA chain that hinders the alignment of CNC domains along the shear direction. To validate this assessment, real time birefringence measurements were made for the various CNC-PVA compositions as illustrated in FIG. 3.

Real-time particle movement was investigated along the shear direction for different PVA-CNC compositions. It should be noted that this experiment has been performed in an aqueous system with a constant shear rate (300 s$^{-1}$). Little birefringence was observed for less then 50 wt % CNC loading. This is a clear indication of a mostly isotropic arrangement. As CNC percentage loading was increased to 70 wt %, the presence of birefringence was observed with intense coloration. Thus, a certain threshold CNC percentage loading is required to exhibit large-scale birefringence. The maximum color intensity of the 70% and 90% CNC composition confirmed maximum anisotropy, which is consistent with the order parameter study shown earlier. The pure CNC coating also showed birefringence, but color intensity reduced over the observation time which suggested faster domain relaxation. The experiment was performed under open atmosphere so three possibilities arise. In the first scenario, faster water evaporation may lead to rapid thickness reduction of the CNC-PVA solution, which resulted in the fading of the color over time. The second reason could be the effect of Brownian motion or rapid chain relaxation leading to thickness variation that produced the color change overtime. The change in momentum of the crystalline domains or polymer chains could be another reason for color variation. As a rapid shear force is applied on the CNC-PVA solution, the CNC crystalline domains and the PVA polymer chains could acquire energy by attaining higher momentum. However, as the source of this force is removed, the crystalline domains or polymer chains begin to relax. The CNCs or polymer chains lose their acquired momentum by dissipating the adsorbed energy which is accompanied by the various color changes.

Water Vapor Transmission Rate (WVTR)

Water vapor transmission rate (WVTR) is a fundamental parameter that details the degree to which water vapor (humidity) can transport through a solid film. A good barrier film/coating for food packaging applications will have a low WVTR value. The mechanism of water vapor transmission depends on free volume, packing density, crystalline-amorphous ratio and hydrophilic/hydrophobic nature of the polymeric materials. PET substrates possess excellent water resistance compared to CNC-PVA composite coatings. Hence; PLA was chosen as it is known to have a relatively high WVTR that precludes its use in many applications. WVTR for different CNC-PVA coatings on the poly (lactic acid) (PLA) substrate has been shown in FIG. 4. There was a noticeable reduction in the WVTR with increasing CNC loading. The crystalline domains of CNC act as a physical barrier (due to higher packing density) and creates a longer tortuous path for the permeation of moisture molecules.

Figure 4:
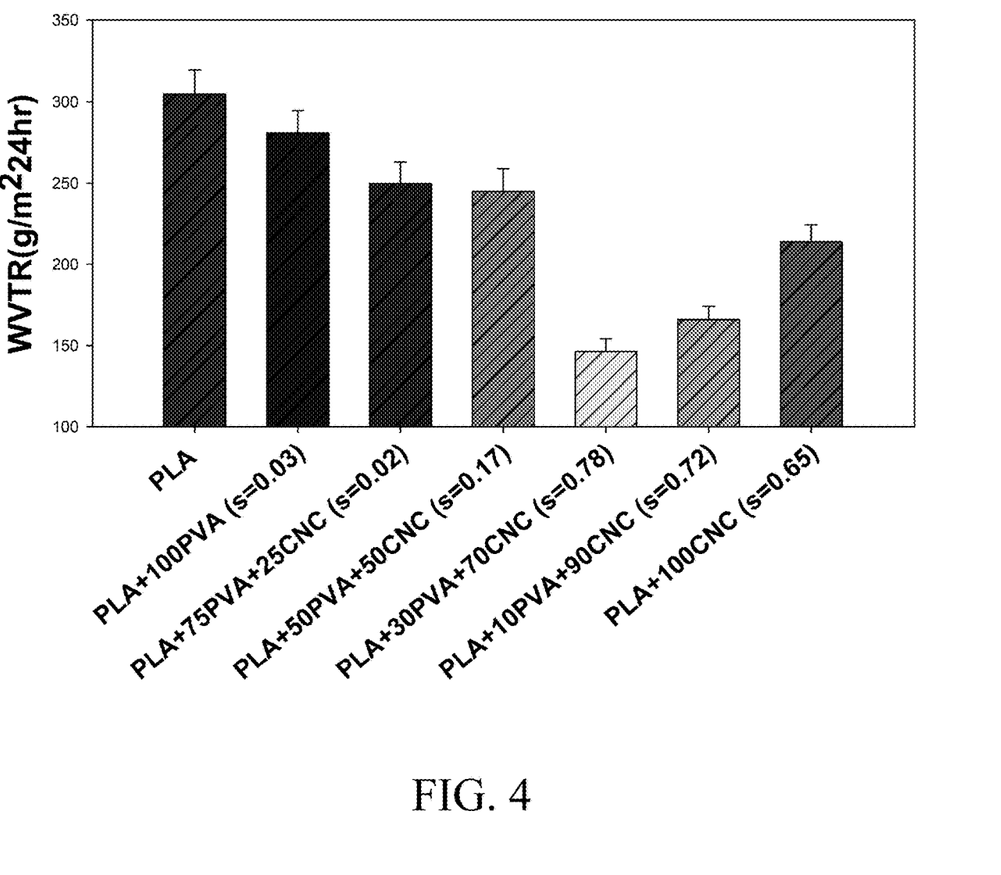
FIG. 4: WVTR with corresponding order parameter for different CNC-PVA coating compositions on a PLA substrate.

The lowest WVTR was observed at 70% CNC loading as compared to any other composition. As indicated earlier, this composition exhibited the maximum order parameter, 0.78, which reduced the free volume of the coating system. So, the combined effect of reduced free volume and increased path-length due to the CNC content lowered the WVTR. However, for CNC loading more than 70%, permeability again increased with increasing CNC loading which clearly contradicts expectation previously reported. See Wahyuningsih et al., Utilization of Cellulose from Pineapple Leaf Fibers as Nanofiller in Polyvinyl Alcohol-Based Film Indonesian Journal of Chemistry 16:181-189. Based on this experimental result, two possible reasons can be deduced for the increment of WVTR. There must be some critical PVA percentage loading where PVA chains can either fill the gap among CNC domains or form a network structure with the CNCs through intermolecular hydrogen bonding with minimum free volume. Below this critical PVA percentage loading, there should be some free volume that enhances WVTR. Another possible reason can be attributed to swelling of the CNC-PVA polymer coating system. After moisture absorption, CNC domains can dislocate from their original position which may provide additional free volume by reducing the overall order parameter.

We claim:

1. A method of continuous roll-to-roll coating of a flexible substrate with at least one cellulose nanocrystal (CNC) layer, wherein the method comprises:
    a) providing a substantially homogeneous aqueous suspension of CNC, wherein the aqueous suspension comprises 4-20 wt % of CNC and 80-96 wt % of water;
    b) providing a roll-to-roll coating device that continuously feeds the flexible substrate;
    c) treating the surface of the flexible substrate to ensure that the flexible substrate has a surface energy value equal or higher than the surface tension of the aqueous suspension of CNC; and
    d) transferring the aqueous suspension of CNC to the surface of the flexible substrate to create a CNC wetted region and continuously passing the wetted region to a drying unit of the roll-to-roll coating device to provide substantially dried CNC coated flexible substrate, wherein the drying temperature is between 60-100° C.;
    wherein the roll-to-roll coating device is a micro gravure roll-to-roll coating device.

2. The method of claim 1, wherein the aqueous suspension comprises 6-12 wt % of CNC and 88-94 wt % of water.

3. The method of claim 1, wherein the drying temperature is between 65-85° C.

4. The method of claim 1, wherein the CNC coated flexible substrate comprises anisotropic coating with order parameter of at least 0.2.

5. The method of claim 1, wherein the CNC coated flexible substrate comprises anisotropic coating with order parameter of 0.2-0.95.

6. The method of claim 1, wherein the flexible substrate is a polyester polymer.

7. The method of claim 1, wherein the aqueous suspension further comprises a water soluble organic polymeric material, a water dispersible inorganic polymeric material, a plasticizer, or any combination thereof.

8. The method of claim 7, wherein the water soluble organic polymeric material is poly(vinyl alcohol) (PVA).

9. The method of claim 7, wherein the weight ratio of CNC to the water soluble organic polymeric material or a water dispersible inorganic polymeric material is at least more than 1.0.

10. The method of claim 8, wherein the weight ratio of CNC to PVA is about 7:3.

* * * * *